3,159,625
3-AMINO-6-SUBSTITUTED-1,2,4-TRIAZINE COMPOUNDS

Yutaka Kodama, Isamu Saikawa, Toyoo Maeda, Akira Takai, and Ikuko Takamichi, all of Toyama-shi, Japan, assignors to Toyama Kagaku Kogyo Kabushiki Kaisha, Tokyo, Japan, a corporation of Japan
No Drawing. Filed Nov. 15, 1961, Ser. No. 152,632
Claims priority, application Japan Nov. 17, 1960
10 Claims. (Cl. 260—240)

This invention relates to compounds having the formula

where R is selected from the group consisting of nitrofuryl, nitrothienyl and nitrophenyl; X is a divalent olefinic radical with a double bond conjugated to R; and T is a 1,2,4-triazine ring substituted at the 3-position by an amino group and connected to X at the 6-position.

More particularly the compounds may be represented by structures II and III as follows:

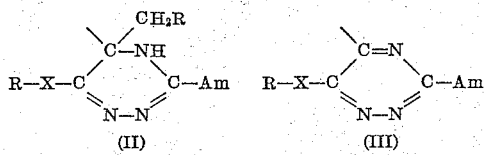

where R and X have the same meaning as above and Am is an amino group, their addition salts and their hydrates. More especially, the invention includes compounds in which R is 5-nitrofuryl.

A number of nitrofuran compounds have shown good antibacterial properties, among them is the compound bis - (5 - nitrofurfurylidene)-acetone guanyl hydrazone. This compound, which is a commercial drug, has antibacterial activity but its solubility and other characteristics still leave something to be desired. This compound serves as the raw material for the production of some compounds of the present invention which possess improved properties. These compounds are characterized by the presence of a 1,2,4-triazine ring formed by cyclization of the guanyl hydrazone.

In general the compounds of the present invention are most useful in the form of salts which show greater water solubility. Salt formation proceeds at ordinary temperature simply by reacting the compound with a corresponding acid in aqueous solution or dispersion. The salt is an addition salt on the amine group in the 3-position of the 1,2,4-triazine nucleus. The salts when crystallized from water may contain water of hydration which may be difficult to remove. It is possible that the elements of water are added on to the triazine ring itself, producing a dihydro triazine. When the salts are dissolved in water and neutralized by addition of base, the base nitrofuran compounds of structure III can be obtained free of water of hydration.

The compounds of the present invention are produced from the starting guanyl hydrazone by heating at a pH above 4.0 in a reaction medium comprising an organic solvent. If the heating is effected in the absence of bases, compounds of structure II result. In the presence of bases, compounds of structure III are formed.

It is an advantage of the present invention that the temperature used is not sharply critical. Temperatures of 100° C. and somewhat above give good results. For example, a range of 100°–140° C. is very suitable but it should be understood that the invention is not limited thereto. The reaction does not proceed as fast or as completely below 100° C. and the top temperature limit is set by decomposition of the desired product. This latter temperature is not sharply defined and therefore no exact upper temperature limit is set in the present invention in exact degrees.

The organic solvents or liquids which are suitable for the reaction medium include practically any organic liquid which is inert to the reactants and which will dissolve the reaction product at elevated temperatures. Typical compounds are the glycols such as ethylene or propylene glycols, dimethylformamide, dimethylsulfoxide, tetrahydrofurfuryl alcohol, butanol, amyl alcohol, dioxane, etc.

Typical basic substances are the hydroxides, carbonates, bicarbonates, phosphates and acetates of the alkali metals, or alkaline earth metals, pyridine, piperidine, hydrazine, ammonia and other organic bases. A mixture of the guanyl hydrazone as the free base and its salt may be used without addition of other basic substances, providing that the pH is maintained above 4.0.

The invention will be described in greater detail in conjunction with the specific examples in which proportions are by weight unless otherwise specified.

EXAMPLE 1

8 parts of bis-(5-nitrofurfurylidene)-acetone guanyl hydrazone sulfate are suspended in 100 parts of dimethylformamide. The suspension is heated at 100–130° C. until solution takes place. After cooling this solution, ammonia is introduced in excess over that required to neutralize the salt and the mixture is then again heated at 130–140° C. until reaction is complete. The mixture is cooled, poured into 300 parts of hydrochloric acid with stirring, and then filtered. The filtrate is then made alkaline with ammonia and cooled until the resulting free base precipitates out. It is recovered by filtration and is purified by recrystallization from a mixture of isopropyl alcohol and methylethyl ketone. A reddish-orange crystalline powder is obtained which does not have a sharp melting point but decomposes at approximately 269° C. Analyses correspond to the hydrate of 3-amino-6-(5'-nitrofurylethenyl)-1,2,4-triazine.

The free base can be transformed into its addition salts by reaction with an aqueous solution of a corresponding acid. In the case of polybasic acids an acid salt ordinarily is produced. The following are typical salts with the temperature at which they melt with decomposition or decompose:

| | ° C. |
|---|---|
| Hydrochloride | 235–239 |
| Hydrobromide | 205 |
| Sulfate | 150 |
| Nitrate | 163–164 |
| Ortho-phosphate | 174 |
| Acetate | 300 |
| Oxalate | 212 |
| Malonate | 271 |
| Maleate | 274 |
| Cyclohexylsulfamate | 132–134 |
| Saccharinate | 208 |

The free base and the physiologically acceptable salts referred to above are effective against various microorganisms including gram-positive and gram-negative bacteria and fungi, as exemplified in the following table:

*Antimicrobial Activity [1] of Hydrochloride From Example I and Furacin*

| | Minimal Inhibitory Concentrations (mcg./ml.) | |
|---|---|---|
| | Hydrochloride from Example I | Furacin |
| Bacillus subtilis ATCC 6633 | 0.05 | 6.2 |
| Staphylococcus aureus ATCC 6538P | 0.8 | 25 |
| Streptococcus pyogenes C-203 | 0.4 | 12.5 |
| Escherichia coli ATCC 9637 | 0.8 | 25 |
| Klebsiella pneumoniae ATCC 10031 | 0.1 | 12.5 |
| Shigella flexneri I | 0.4 | 12.5 |
| Trichophyton mentagrophytes | 3.1 | >109 |

[1] Agar dilution technique used.

The compound is relatively non-toxic when orally administered to mice. The $LD_{50}$ is about 500 mg./kg. No serious side-effects were observed on continuous use in lower doses over a long period. These compounds in general do not show cross resistance with present commercial antibiotics. The salts are soluble in water and are generally useful, it being noted that the saccharine salt retains the normal sweet taste.

EXAMPLE 2

The procedure of Example 1 is repeated, replacing the ammonia with sodium bicarbonate. The reaction temperature is 120° C.

Instead of recrystallizing the base it is converted into its yellow hydrochloride by treatment with dilute hydrochloric acid and then recrystallized from 12 parts of water. The crystalline product decomposes at 236–239° C. and analysis correspond to those calculated for the hydrate of 3-amino-6-(5'-nitrofurylethenyl)-1,2,4-triazine hydrochloride.

EXAMPLE 3

The procedure of Examples 1 and 2 are repeated, replacing the dimethylformamide with a slightly smaller amount of tetrahydrofurfuryl alcohol and replacing the sodium bicarbonate with a saturated aqueous solution of trisodium phosphate. The phosphate is added in small portions and the temperature after the addition is complete is 120–140° C.

Most of the tetrahydrofurfuryl alcohol is recovered by distillation under reduced pressure and the remaining mass is treated with dilute hydrochloric acid to dissolve the water-soluble salt. After filtration the filtrate is rendered alkaline with a solution of sodium hydroxide and the free base described in Example 1 is recovered by filtration.

EXAMPLE 4

5 parts of the guanyl hydrazone sulfate used in Examples 1 to 3 are suspended in 500 parts of n-butanol and the pH of the suspension is adjusted to 6.5 with 10% aqueous sodium hydroxide. Heating is then carried on at the reflux until the reaction is complete. The mixture is then acidified with hydrochloric acid and the undissolved materials recovered by filtration. The butanol is recovered from the filtrate by distillation under reduced pressure. After removing the solvent the remaining residue is extracted with a small amount of water followed by filtration and the aqueous solution is neutralized with dilute sodium hydroxide until the reddish orange colored 3-amino-6-(5'-nitrofurylethenyl)-1,2,4-triazine precipitates out.

EXAMPLE 5

10 parts of bis-(5-nitrofurfurylidene)-acetone guanyl hydrazone sulfate are suspended in 70 parts of dimethylformamide and the resulting suspension heated at 100–130° C. at a pH of more than 4.0, but in the absence of added basic substances. After the reaction is completed the yellowish orange colored solution is distilled under reduced pressure to recover the dimethylformamide and the remaining residue extracted with dilute aqueous sulfuric acid. The undissolved materials are removed by filtration and the filtrate made alkaline with ammonia. A free base of orange-red color separates out. The yield is quite low, averaging about 30 percent.

The base obtained is reacted with dilute aqueous hydrochloric acid to form a yellow crystalline powder which is purified by recrystallization from water. It decomposes at 236°. Analyses correspond to those calculated for 3-amino-5-(5'-nitrofurfuryl)-6-(5' - nitrofurylethenyl)-4,5-dihydro-1,2,4-triazine hydrochloride.

EXAMPLE 6

A mixture of 10 parts of bis-(5-nitrofurfurylidene)-acetone guanyl hydrazone hydrochloride and 20 parts of the corresponding free base are suspended in 200 parts of dimethylformamide. The suspension is heated at 110–130° C. to completely dissolve the material and to complete the reaction. Thereupon the reaction mixture is added to 600 parts of water acidified with hydrochloric acid, the procedure being effected with good agitation. The mixture is then filtered and the filtrate which is of reddish orange color is neutralized with a dilute aqueous sodium hydroxide solution. A yellowish orange colored free base separates out and is suspended in 50 parts of water to which some concentrated hydrochloric acid is added sufficient to form the salt. At first the mixture becomes a syrup, but after a short while yellow crystalline hydrochloride salt is separated out. It decomposes at 236° C. and is the same salt as in Example 5. The yield is only approximately 20 percent.

EXAMPLE 7

Two parts of bis-5-(nitrothienylidene)-acetone are suspended in 50 parts of acetonitrile, 1.35 parts of aminoguanidine hydrochloride are then gradually added; after the addition is complete the mixture is heated. The reaction proceeds smoothly and a reddish orange hydrochloride of the corresponding guanyl hydrazone results. This compound melts at about 265° C. with decomposition. The yield is almost quantitative.

1.5 parts of the guanyl hydrazone hydrochloride and 0.2 part of sodium dihydrogen phosphate are heated in 20 parts of dimethylformamide at 130° C. Gradual solution takes place, forming a dark red solution. After the reaction is complete, the mixture is cooled, acidified with HCl and diluted with 50 parts of water. Undissolved materials are then filtered off and the filtrate is neutralized with ammonia. A yellowish brown free base is obtained, which decomposes at temperatures in the range of 195 to 200° C. and which constitutes 3-amino-5 - (5' - nitrothenyl) - 6 - (5 - nitrothienylethenyl) - 4,5-dihydro-1,2,4-triazine.

EXAMPLE 8

Five parts of bis-(p-nitrobenzylidene)-acetone is suspended in 150 parts of dioxane and 3 parts of aminoguanidine hydrochloride in hot aqueous solution is gradually added. The reaction mixture gradually turns from yellow to yellowish orange and it is heated at the reflux until the reaction is complete, whereupon the mixture is allowed to cool and a precipitate which forms is filtered off. It constitutes bis-(p-nitrobenzylidene)-acetone guanyl hydrazone hydrochloride, which decomposes at approximately 285° C. The yield is very good.

Three parts of the hydrochloride is mixed with 20 parts of dimethylformamide and 0.4 part of sodium sulfite. The mixture is heated with stirring at 130°–140° C. until the reaction is complete, whereupon the mixture is cooled. Unreacted materials are removed by filtration and the filtrate is then acidified with hydrochloric acid and diluted with 40 parts of water. A small amount of remaining unreacted material is removed by filtration and the filtrate is then made alkaline with ammonia. A pale yellow base separates out and is recovered. When treated with dilute hydrochloric acid, it forms the hydrochloride as yellow crystalline material which, after recrystallization from water, shows a melting point of approximately 144° C.

The hydrochloride is dissolved in water and the solution again made alkaline with ammonia. The pale yellow base precipitates out and is 3-amino-5-(p-nitrobenzyl)-6-(p-nitrostyryl)-4,5-dihydro-1,2,4-triazine.

EXAMPLE 9

1.5 parts of the base produced in Example 7 is introduced into 12 parts of dimethylformamide and 0.15 part of sodium acetate added. The mixture is then heated with stirring at 130° C. until reaction is complete. Thereafter, the mixture is permitted to cool; it is acidified and diluted with three times its weight of water. Undissolved materials are removed by filtration and the filtrate is made alkaline. A reddish-orange colored base separates out, which can be recrystallized from acetone to produce a pure product, decomposing at about 286° C. The compound has the formula:

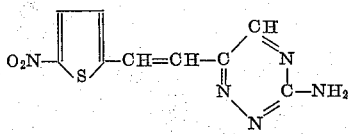

The free base, when reacted with aqueous hydrochloric acid, produces the hydrochloride which decomposes at about 260° C. and in a similar manner the hydrobromide can be obtained, decomposing at about 255–256° C.

EXAMPLE 10

The procedure of Example 9 is repeated but the intermediate product of Example 8 is used instead of Example 7. The resulting product has the formula:

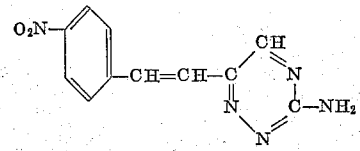

The base can be transformed into the addition salts, such as the hydrochloride or the hydrobromide, in the same manner as in Example 9.

EXAMPLE 11

Two parts of bis-(5-nitrothenylidene)-acetone guanyl hydrazone, 0.25 part of sodium carbonate, and 20 parts of dimethylformamide are heated at 130° C. until the reaction is complete. The mixture is then acidified with hydrochloric acid and diluted with 60 parts of water. Some black, undissolved material is removed by filtration and the filtrate is neutralized with a sodium carbonate solution. A reddish-orange colored base separates out and is purified by recrystallization from acetone. It has the same formula as the base described in Example 9.

EXAMPLE 12

25 parts of bis-(p-nitrobenzylidene)-acetone guanyl hydrazone hydrochloride, 0.65 part of sodium bicarbonate and 20 parts of dimethylformamide are heated at 130° C. until the reaction is complete. The mixture is then diluted with 50 parts of water and acidified with hydrochloric acid. The mixture is filtered and the filtrate made alkaline with ammonia and again filtered. The crystalline mass collected is washed well with ether and methanol to remove any p-nitrotoluene produced. Then it is recrystallized from dimethylformamide to form yellow-orange colored crystalline needles, decomposing at about 305° C. and having the formula of the compound of Example 10.

EXAMPLE 13

5-nitrofurfuraldehyde is reacted with diethyl ketone in the presence of catalyst to form α-bis-(5-nitrofurfurylidene)-diethyl ketone. This ketone is converted to the corresponding guanyl hydrazone. Twenty parts of this guanyl hydrazone are added to 200 parts of dimethylformamide with stirring and then 4.2 parts of 50% sodium hydroxide are added dropwise. The reaction mixture is heated at 130° C. until completion. It is cooled and poured into an excess of HCl solution. This aqueous solution is filtered, made alkaline with sodium carbonate, and a reddish-orange colored base separates. This 3-amino-5-methyl-6-[1-(5'-nitrofurfurylidene)-ethyl] - 1,2,4-triazine is recrystallized from acetone. The base is readily converted to its salts.

EXAMPLE 14

According to the procedure given in Example 2 the monomethylguanyl hydrazone of bis-(5'-nitrofurfurylidene)-acetone is treated in solvent at pH greater than 6 to produce 3-methylamino-6-(5'-nitrofurylethenyl)-1,2,4-triazine and its salts.

EXAMPLE 15

According to the procedure given in Example 1 the dimethylguanyl hydrazone of bis-(5'-nitrofurfurylidene)-acetone is treated in solvent at pH greater than 6 to produce 3-dimethylamino - 6 - (5'-nitrofurylethenyl)-1,2,4-triazine and its salts.

We claim:

1. A compound selected from the group consisting of compounds of the formula

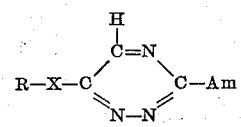

in which R is selected from the group consisting of nitrofuryl, nitrothienyl and nitrophenyl; X is a divalent lower alkenyl radical with its double bond conjugated to R; Am is amino, and their addition salts of physiologically acceptable acids, and their hydrates.

2. A compound selected from the group consisting of compounds of the formula

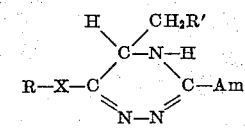

in which R is selected from the group consisting of nitrofuryl, nitrothienyl and nitrophenyl; R' is selected from the group consisting of hydrogen and $RCH_2$; X is a divalent lower alkenyl radical with the double bond conjugated to R; Am is amino and their addition salts of physiologically acceptable acids and their hydrates.

3. The compound of the formula

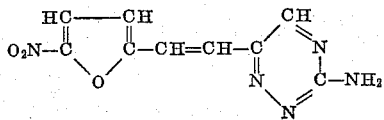

4. An acid addition salt of the compound of claim 3.

5. The compound of the formula
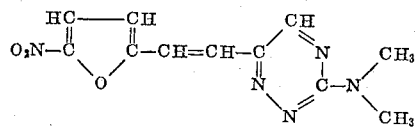
6. An addition salt of the compound of claim 5.
7. The compound of the formula
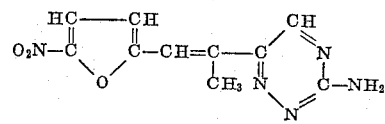
8. An acid addition salt of the compound of claim 7.
9.
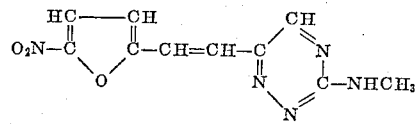
10. An acid addition salt of the compound of claim 9.
References Cited in the file of this patent
Dann et al.: "Chemische Berichte," vol. 82 (1949), pp. 81–88. QD 1 D4.
Miura et al.: "Journ. Pharm. Chem. Soc.," vol. 81, No. 9 (1961), pp. 1357–60 and 1372–74. RS1P45.